United States Patent
Costin et al.

(10) Patent No.: US 7,355,309 B2
(45) Date of Patent: Apr. 8, 2008

(54) PERMANENT MAGNET ROTOR FOR A DIRECT DRIVE GENERATOR OR A LOW SPEED MOTOR

(75) Inventors: Daniel Costin, Chelsea, VT (US); Vinod John, Montbellier, VT (US)

(73) Assignee: Northern Power Systems, Inc., Waitsfield, VT (US)

( * ) Notice: Subject to any disclaimer, the term of this patent is extended or adjusted under 35 U.S.C. 154(b) by 35 days.

(21) Appl. No.: 11/192,384

(22) Filed: Jul. 28, 2005

(65) Prior Publication Data

US 2006/0028083 A1 Feb. 9, 2006

(51) Int. Cl.
*H02K 21/12* (2006.01)
(52) U.S. Cl. ............... 310/156.08; 310/156.74
(58) Field of Classification Search ................. 310/156.74–156.77
See application file for complete search history.

(56) References Cited

U.S. PATENT DOCUMENTS

| | | | | |
|---|---|---|---|---|
| 3,258,623 A * | 6/1966 | Phelon et al. | ........... | 310/156.31 |
| 4,146,806 A * | 3/1979 | Katsumata | ................. | 310/153 |
| 4,179,634 A * | 12/1979 | Burson | ..................... | 310/153 |
| 4,260,921 A | 4/1981 | Silver | | |
| 4,393,320 A * | 7/1983 | Anderson | .............. | 310/156.77 |
| 4,879,485 A * | 11/1989 | Tassinario | .............. | 310/156.19 |
| 4,973,872 A | 11/1990 | Dohogne | | |
| 4,980,592 A * | 12/1990 | Olmr et al. | .................. | 310/153 |
| 5,091,668 A * | 2/1992 | Cuenot et al. | ......... | 310/156.61 |
| 6,093,992 A * | 7/2000 | Akemakou | ............. | 310/156.55 |
| 6,175,177 B1 * | 1/2001 | Sabinski et al. | ....... | 310/156.55 |
| 6,452,301 B1 | 9/2002 | Van Dine et al. | | |
| 6,492,756 B1 | 12/2002 | Maslov et al. | | |
| 6,509,664 B2 * | 1/2003 | Shah et al. | .................. | 310/181 |
| 6,548,932 B1 * | 4/2003 | Weiglhofer et al. | .... | 310/156.19 |
| 6,603,232 B2 * | 8/2003 | Van Dine et al. | ....... | 310/156.01 |
| 6,802,385 B2 | 10/2004 | Pyntikov et al. | | |
| 6,891,299 B2 * | 5/2005 | Coupart et al. | ......... | 310/156.55 |
| 6,926,454 B1 | 8/2005 | Naganuma et al. | | |
| 2002/0125779 A1 | 9/2002 | Qin et al. | | |
| 2003/0080640 A1 * | 5/2003 | Weiglhofer et al. | .... | 310/156.12 |
| 2004/0090135 A1 | 5/2004 | Maslov et al. | | |
| 2006/0255679 A1 * | 11/2006 | Dine et al. | ............. | 310/156.55 |

* cited by examiner

*Primary Examiner*—Thanh Lam
(74) *Attorney, Agent, or Firm*—Cantor Colburn, LLP

(57) ABSTRACT

In order to provide a less expensive generator, a rotor using nonmagnetic beams is disclosed. The rotor includes a magnetic steel rim connected to a main generator shaft by a hub. The magnetic rim supports the components of the rotor, which includes a plurality of magnets and pole pieces. The pole pieces are connected to the rim with non-magnetic standoffs and nonmagnetic fasteners. The magnets are supported radially by nonmagnetic beams. The magnets are retained tangentially by pole pieces and radially by wedges. The components of the rotor are further retained axially between plates coupled to the rim and a shoulder on the pole pieces.

10 Claims, 9 Drawing Sheets

PERMANENT MAGNET ROTOR FOR A DIRECT DRIVE GENERATOR OR A LOW SPEED MOTOR

TECHNICAL FIELD

This disclosure relates generally to a rotor for a permanent magnet generator or low speed motor such as that found in wind turbines and especially to a permanent magnet rotor using lower cost nonmagnetic structural members.

BACKGROUND ART

As the demand for energy has increased and the supplies of fossil fuel dwindled there has been a renewed look by electrical utility companies at alternative methods for producing electrical power. One method of electrical production involves the harnessing of the wind by a wind turbine to drive an electrical generator.

Wind turbines typically involve using a series of blades fixed to the top of a tower to rotate about a horizontal axis. The blades have an aerodynamic shape such that when a wind blows across the surface of the blade, a lift force is generated causing the series of blades to rotate a shaft about an axis. The shaft is connected, typically via a gearing arrangement, to an electrical generator located in a structure called a nacelle positioned behind the blades. The gear box converts the rotation of the blades into a speed usable by the generator to produce electricity at a frequency that is proper for the electrical grid.

Alternatively, a wind turbine may use a direct drive permanent magnet generator. This configuration has the advantage of eliminating an expensive and low reliability component, namely the gear box. A typical high-speed generator, such as that used with a gear box, will have a rotor with permanent magnets and a solid core. Due to the high speed of the rotor it is only feasible to have a small number of poles at a relatively small diameter. For low-speed generators, such as that used in a direct drive wind turbine, a larger diameter and/or more poles are needed to generate power.

These large diameter rotors are often hollow in order to conserve material and reduce weight. Permanent magnet rotors can additionally be split into two types: those with magnets mounted on the surface of a magnetic steel rim; and those with magnets interspersed between magnetic steel rotor poles. The disadvantage of the steel rim is that the magnets are positioned very close to the stator. Due to the heat generated by the stator, heat damage may result to the magnet and cause it to lose its magnetic properties. The rotor type with steel poles provides better protection of the magnets from the heat, but the rim must be made from a non-magnetic material. While an aluminum materials may work well for a small diameter rotor, the use of stainless steel is usually required in the megawatt range to avoid thermal expansion issues. Additionally, stainless steel is often prohibitively expensive when compared to magnetic steel such as plain-carbon steel.

Another common feature of permanent magnet rotors is to use a wedge to hold the magnets in place. A plate is then fixed at each end to retain the magnets and wedges. Only one plate must be removed in order to install or remove the magnets and wedges. When the rotor is assembled, typically dummy magnets, made from a nonmagnetic metal, are utilized during assembly in place of the magnets. The dummy magnets are used in order to evenly locate the rotor poles before tightening the bolts. The dummy magnets are sized slightly larger than the permanent magnets so that the magnets will slide easily into place.

Accordingly, it is considered desirable to provide a rotor which utilizes non-stainless steel structural members to lower cost while minimizing the effects of thermal expansion during operation. Additionally, it is also desirable to provide an integrated rotor design that eliminates the need for dummy magnets during assembly.

SUMMARY OF INVENTION

The present invention includes a generator having a rim which is made of inexpensive magnetic steel, and is separated from the active materials of the rotor by a non-magnetic standoffs and non-magnetic beams. The present invention will retain the magnets, wedges and beams with a tab on the outer diameter of the pole pieces.

The present invention further includes a pole piece having at least one notch. The beam flange is arrange to fit within the pole piece notch to allow ease of assembly. During operation, the beam deflects under centripetal load on to the pole piece notch transferring the centripetal load from magnet to the pole piece.

The present invention further includes a permanent magnet rotor including at least two pole pieces having an inner and outer surface thereon and a shoulder extending perpendicular to the plane of the inner and outer surfaces. A rim is also included having an inner diameter, an outer diameter and an axis of rotation. At least one standoff positioned between the pole piece inner surface and the rim outer diameter. At least two fasteners, each fastener coupling one of the at least two pole pieces to said rim and, at least one wedge having an inner and outer surface, each wedge being positioned between two of the pole pieces and being in contact with the shoulder.

The present invention further includes a method of assembling a permanent magnet rotor. The method includes the steps of positioning a first standoff between a pole piece to a rim. Fastening said pole piece to the rim. Positioning a magnet between two pole pieces. Positioning a beam between the magnet and the rim and, retaining said magnet and said beam with a wedge. Optionally, the pole piece may include a lip wherein the wedge is inserted until the wedge contacts the lip.

The above discussed and other features will be appreciated and understood by those skilled in the art from the following detailed description and drawings.

BRIEF DESCRIPTION OF THE DRAWINGS

Referring now to the drawings, which are meant to be exemplary and not limiting, and wherein like elements are numbered alike.

DETAILED DESCRIPTION OF THE PREFERRED EMBODIMENTS

Electrical power may be generated by many different methods. The most common methods involve the boiling of water using fossil or nuclear based fuels. The steam produced by the boiling is used to rotate a turbine that drives an electrical generator to create the electrical power. While these common methods are very efficient, they also have undesirable side effects, such as the production of toxic pollutants, or rely on a dwindling natural resource. One alternate method of creating electrical power is to harness a renewable natural resource such as the wind to be a driving force to rotate the electrical generator to produce the electricity.

Figure 1:
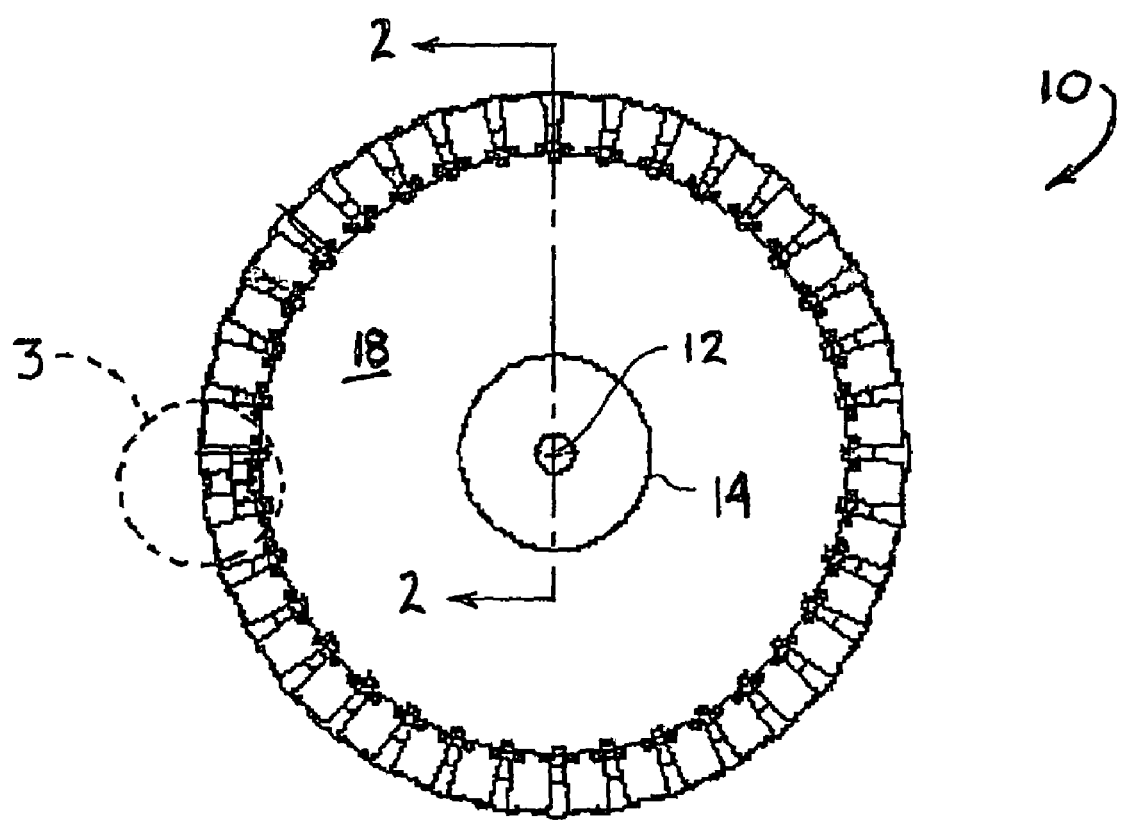
FIG. 1 is a front view illustrating a permanent magnet rotor assembly of the present invention.
Figure 2:
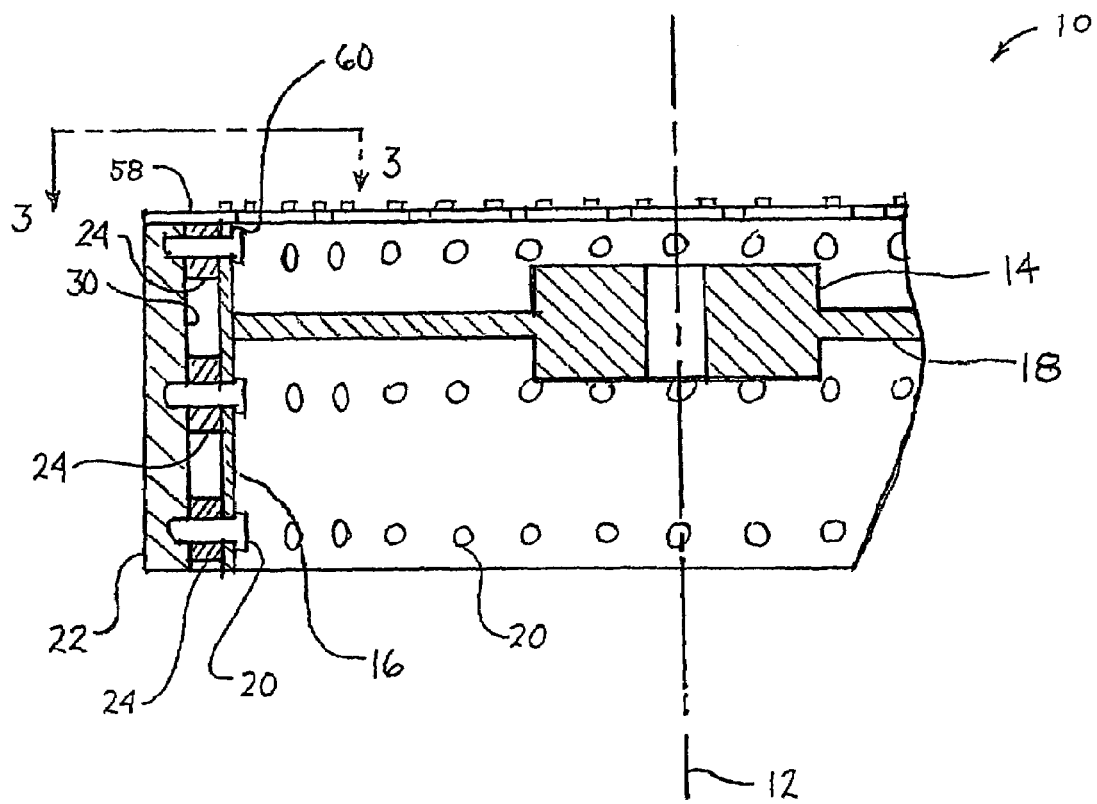
FIG. 2 is a side view, partially in section, illustrating the permanent magnet rotor assembly of FIG. 1.
Figure 3:
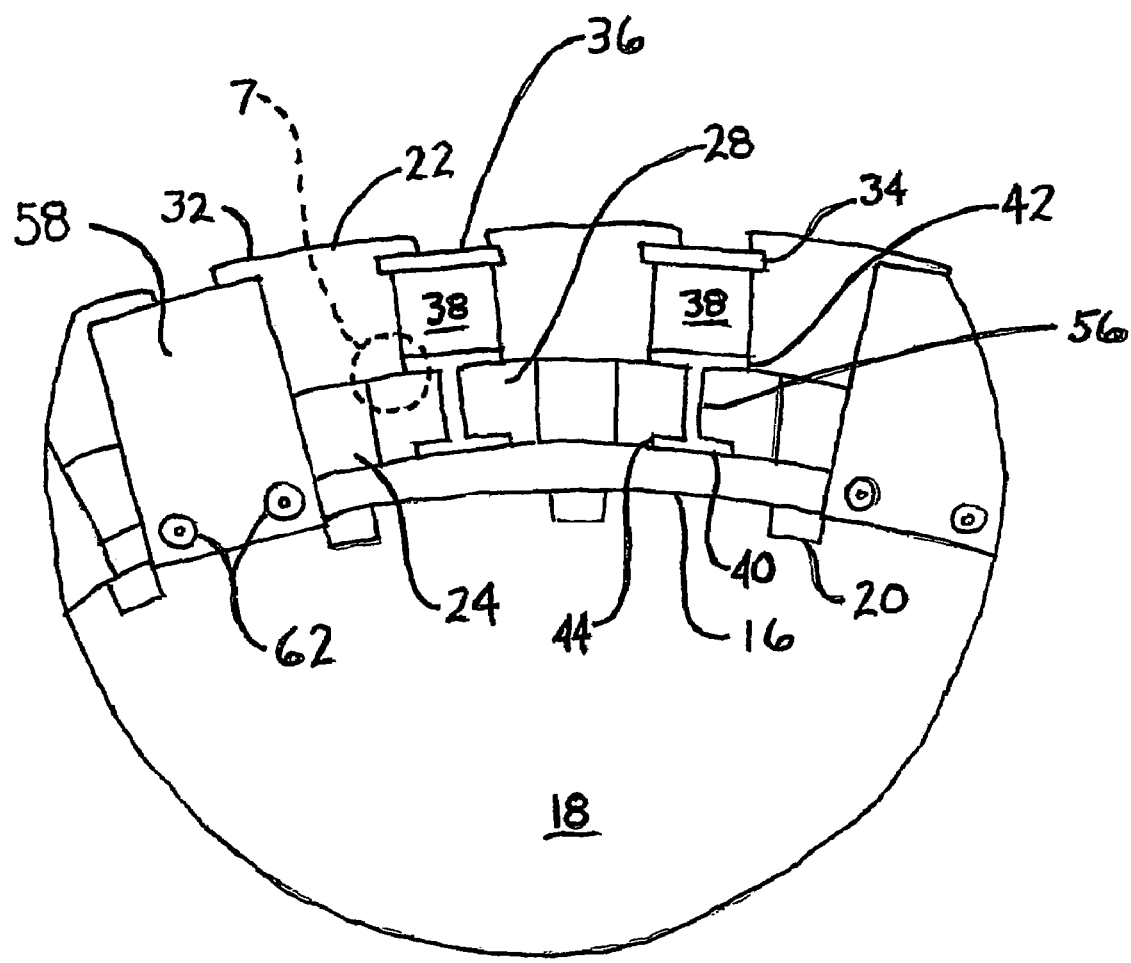
FIG. 3 is a front detailed view, of the permanent magnet rotor of FIG. 1.

As the power levels required from wind turbines have increased, the diameter of the electrical generator has correspondingly increased. The rotor diameter in an electrical generator for a megawatt class wind turbine is generally between 3-5 meters. Referring to FIGS. 1-3, a generator rotor capable of generating electrical power in the 1 MW to 1.5 MW range is shown.

The rotor 10 rotates about an axis 12 and includes a hub 14 and a rim 16. The hub 14 and rim 16 are connected by a support portion 18. The hub 14 and rim 16 may be joined to the support portion by any suitable means, such as but not limited to welding. In the preferred embodiment, the hub 14, rim 16 and support 18 are made from magnetic steel, such as carbon steel. It should be appreciated that while the support portion 18 is illustrated as being a solid member, it is contemplated that the support portion 18 could contain holes to reduce weight or be comprised of multiple pieces, such as spokes that connect the rim 16 to the hub 14.

The rim 16 further includes a plurality of holes sized to receive fasteners 20. The holes are spaced equally around the circumference of the rim 16. As will be described in more detail below, in the preferred embodiment, three sets of holes and fasteners are used to mount the pole pieces 22 to the rim 16 to provide adequate support to secure the pole pieces 22 to the rim 16. The fasteners 20 may be of any suitable type such as but not limited to screws, bolts or rivets. In the preferred embodiment, the fastener 20 is a hex-head cap screw made from a non-magnetic stainless steel.

Figure 8:
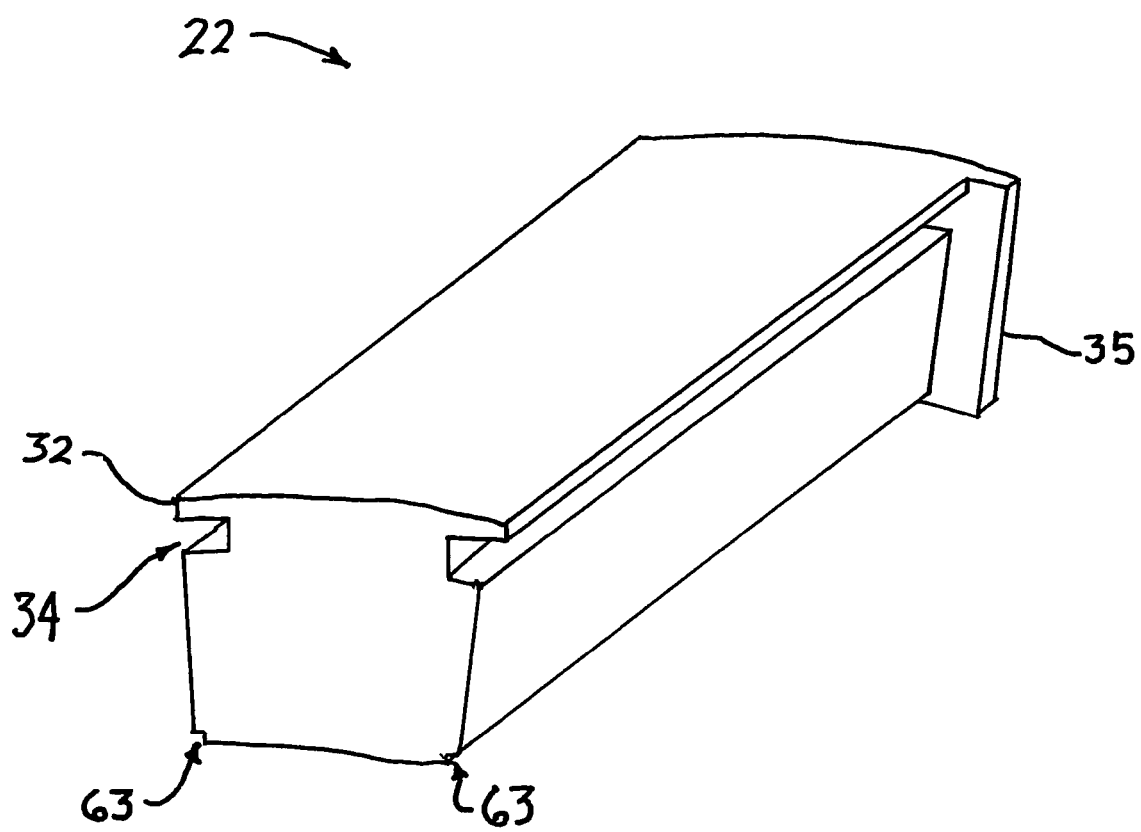

Each fastener 20 passes through a standoff 24 which is captured between the pole piece 22 and the rim 16 by the clamping force generated by fastener 22. In the preferred embodiment, the standoff 24 is comprised of three individual pieces (FIG. 8). However, it is contemplated that the standoff 24 could be made from two or even a single piece formed to fit securely against the rim 16.

Figure 5:
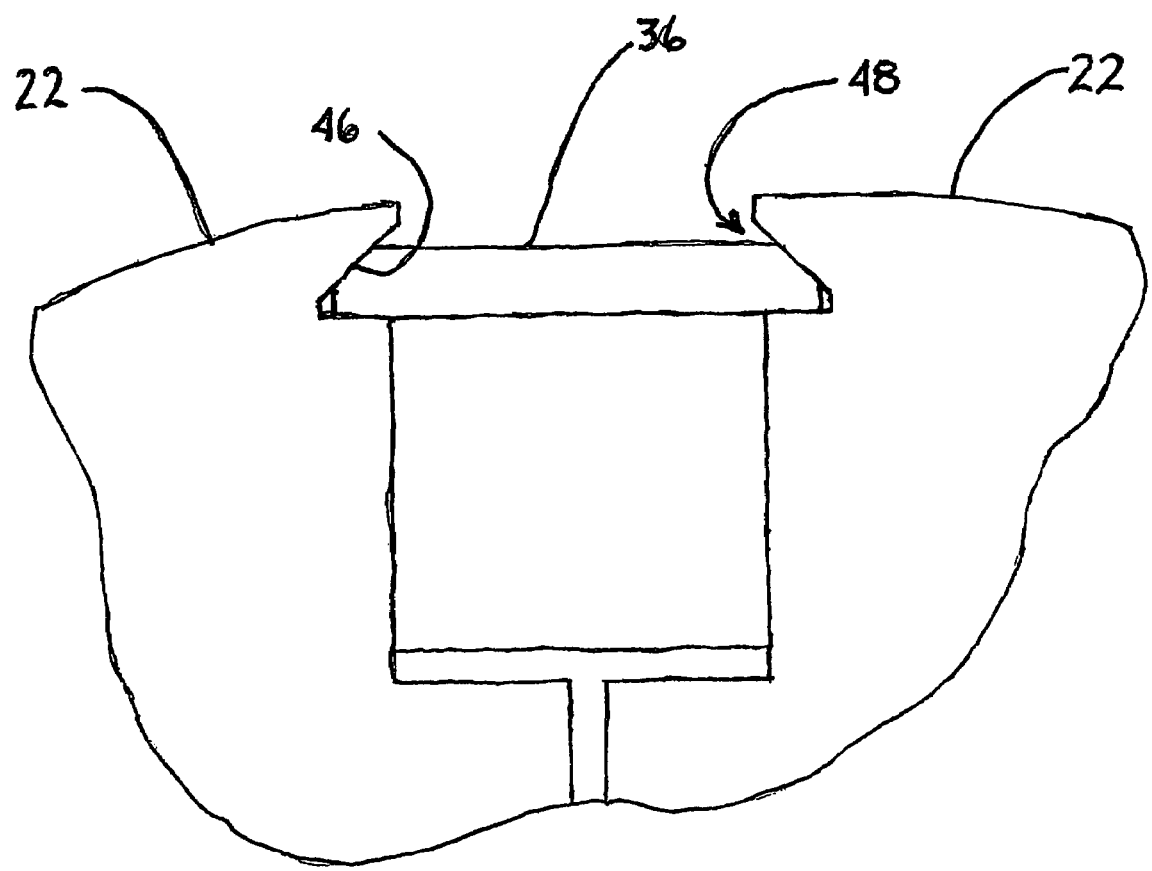
FIG. 5 is a fragmentary enlarged view of a second alternate embodiment wedge configuration.
Figure 6:
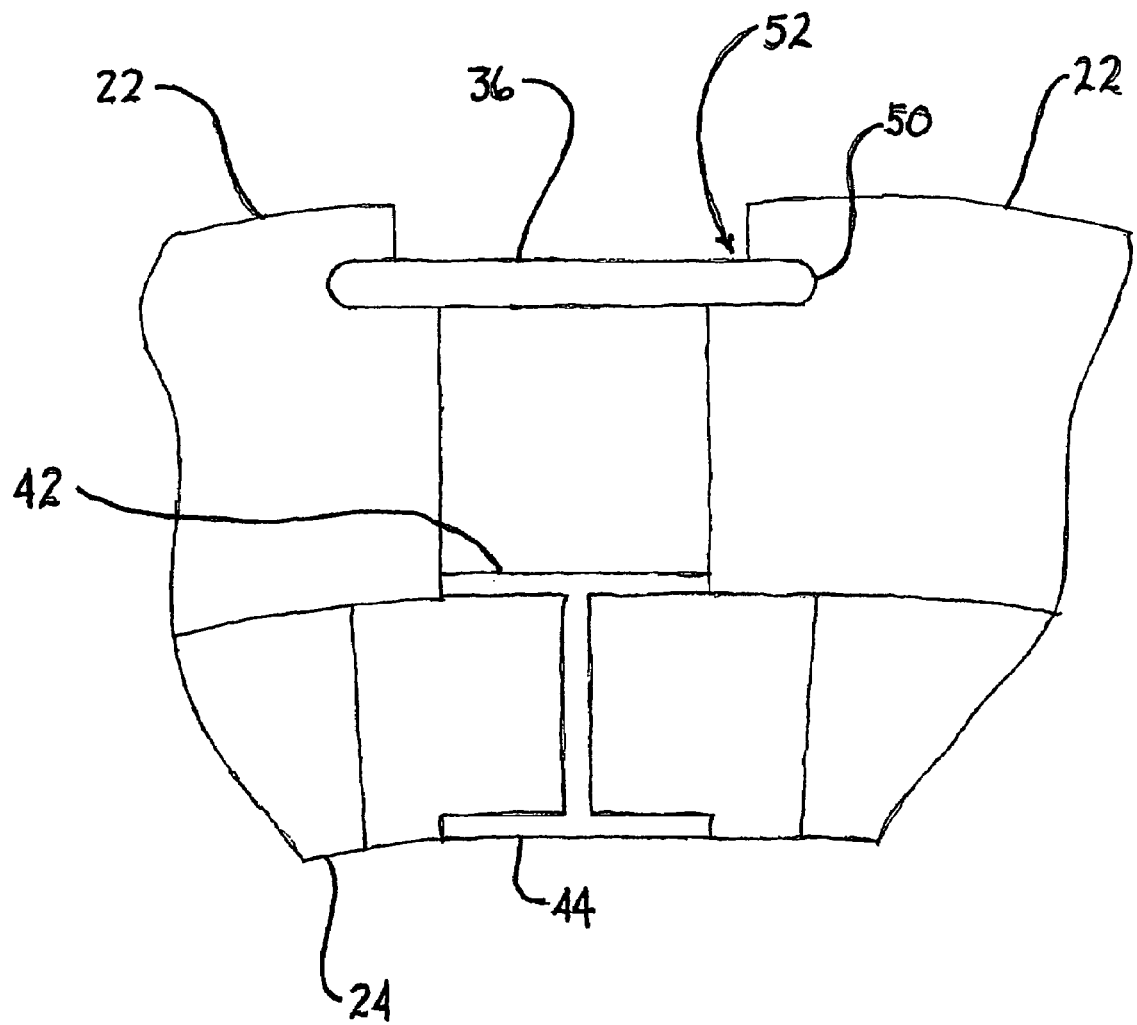
FIG. 6 is a fragmentary enlarged view of another a third alternate embodiment wedge configuration.

The pole piece 22 has an inner surface 30 that is adjacent to and held against the standoff 24. A lip portion 32 extends circumferentially along the outer diameter of the pole piece 22. Adjacent to the lip 32 is a recess 34 sized to receive a wedge 36. Additionally, a shoulder portion 35 (FIG. 8) extends generally perpendicular to the lip 32 along one end of the pole piece 22. The pole piece 22 is typically made from a laminated material that is either welded or mechanically fastened together. In the preferred embodiment, the pole piece 22 is made from magnetic steel. The wedge 36 is preferably made from a non-magnetic material such as but not limited to aluminum or nonmagnetic stainless steel. The wedge 36 may have a constant rectangular cross section as shown in FIG. 3, or alternatively, a different profile as shown in FIG. 5 and FIG. 6.

The first alternate embodiment wedge 36 includes an angled surface 46 that mates against a corresponding surface in the recess 48 of pole piece 22. The second alternate embodiment wedge 36 includes a curved surface 50 that is sized to fit into a corresponding curved recess 52 in the pole piece 22. The wedge 36 could include any interlocking shape provided that a corresponding recess is provided in pole piece 22 to hold the wedge in place.

Once inserted into the rotor 10, the wedge 36 retains a magnet 38 against a beam member 40 and supports the magnet during operation. The magnet 38 has an inner surface the which abuts against the outer flange 42 of beam 40. Magnet 38 is typically made from a rare-earth material such as neodymium-iron-boron. An optional rubberized coating or nonmagnetic sleeve (not shown) may be utilized to protect the magnets during installation and operation. In the preferred embodiment, beam 40 further includes a web portion 56 that connects outer flange 42 to an inner flange 44. The inner flange 44 rests against the outer diameter of the rim 16. In the exemplary embodiment the flat flange 44 does not match the curvature of the rim 16 to aid in manufacturing and to lower costs. The beam 40 may be made from any suitable nonmagnetic material having the appropriate physical characteristics of strength and thermal coefficient of expansion. In the preferred embodiment, the beam 40 is made of an aluminum 6061 alloy. This use of a nonmagnetic aluminum alloy provides a number of advantages. By separating the magnet 38 from the rim 16 by a nonmagnetic member, the rim 16 may then be made from lower cost carbon steel instead of a more expensive stainless steel or aluminum which causes thermal expansion issues. It should also be appreciated by those skilled in the art that while the beam 40 is illustrated as an "I-beam", the beam 40 may be of any suitable shape that minimizes weight while maintaining the appropriate level of strength to support the magnets.

Figure 7:
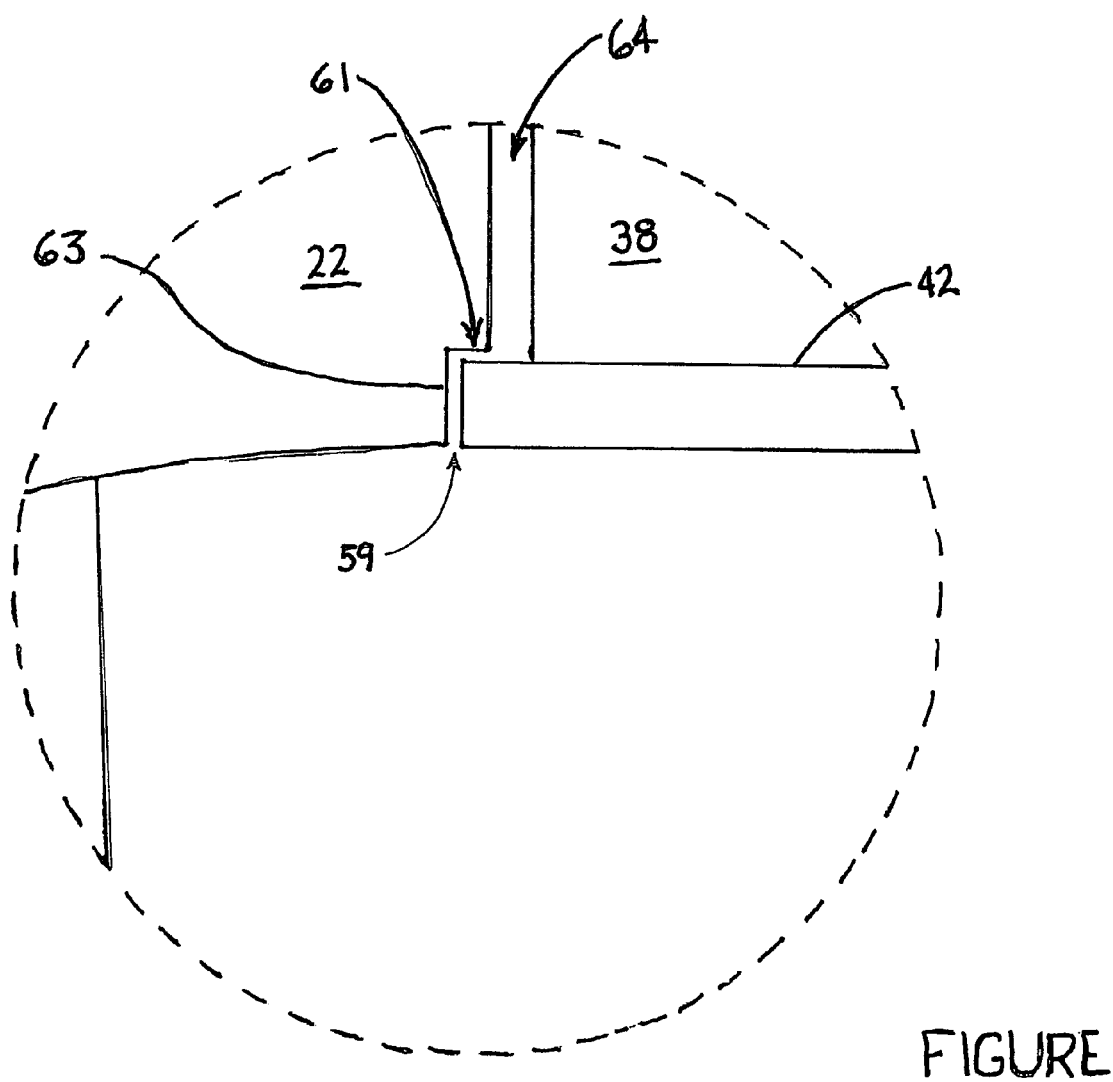
FIG. 7 is an enlarged view illustrating the arrangement of the beam, magnet and pole piece as assembled.
Figure 7A:
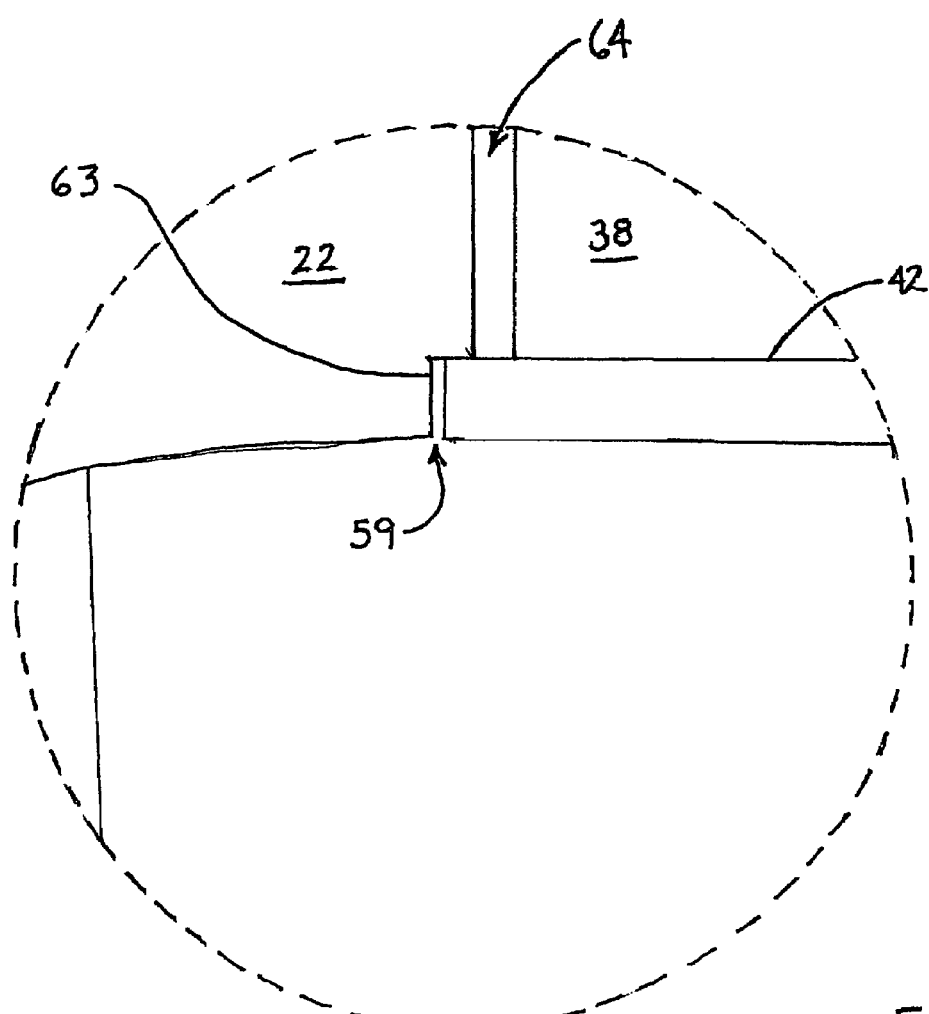
FIG. 7A is an enlarged view illustrating the arrangement of the beam, magnet and pole piece during operation; and, FIG. 8 is a perspective view illustrating the pole piece and standoffs shown in FIG. 1.

During a conventional assembly process, fake or what were commonly referred to as "dummy" magnets where used in the rotor assembly. The use of the dummy magnets allowed the accurate spacing of pole pieces before the tightening of fasteners. The present invention provides an optional means for eliminating the need for a dummy magnet. Referring to FIG. 7, an enlarged view of the flange 42, magnet 38 and pole piece 22 may be seen. In this alternate embodiment, the flange 42 on the beam 40 is slightly larger in width than the magnet 38. This results in the pole piece 22 being slightly offset from the magnet 38 creating a gap 64 between the magnet and the pole piece 22. Thus the space between the pole pieces 22 will always be slightly larger than the magnet 38 allowing accurate assembly of the pole pieces while reducing the number of steps required for assembly.

Optionally, the pole piece 22 may include a notch 63, which when assembled with the beam 40 forms a small gap 59, 61 between the notch 63 and the flange 42. The gap 59, 61 is small, approximately 0.5 mm, to allow ease of assembly. During operation, due to the centripetal loading of the components, a portion of the gap 61 will close allowing the flange 42 to contact and be supported by the pole piece 22. By allowing the flange 42 to be supported by the pole piece 22, the centripetal loading from the beam 40 is transferred to the pole piece 22 and away from the magnet 38 which has lower physical strength properties than the pole piece 22.

Additionally, the use of the notch 63 also allows assembly of the beam 40 and pole piece 22 without the use of the dummy magnets.

A retainer plate 58 is mounted to the top edge 60 of the rim 16 by a pair of fasteners 62. The retainer plate 58 extends over the beam 40, magnet 38 and wedge 36 and the edges of pole piece 22 and standoff 24 to secure the parts axially in the rotor 10. When assembled, the retainer plate 58 is located opposite the pole piece shoulder 35. The retainer plate 58 is made from a suitable nonmagnetic material, preferably aluminum.

Figure 4:
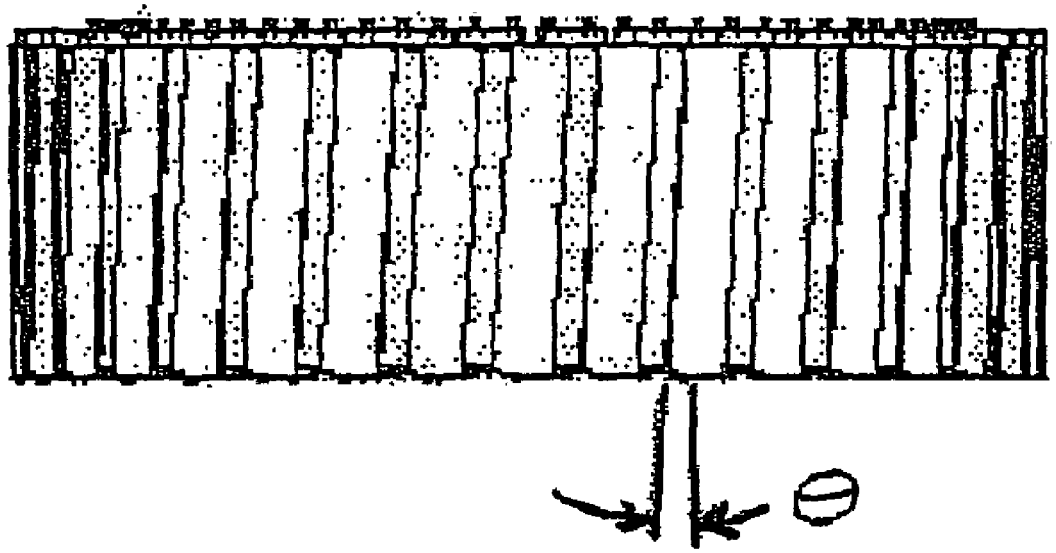
FIG. 4 is a side view of an alternate embodiment permanent magnet rotor where the poles are skewed.

The present invention also applies equally as well with a rotor 10 having skewed poles. In order to reduce the effects of cogging torques, it is common for a generator to have a rotor where the poles are skewed, or on an angle to the axis of rotation. By reducing the cogging effect, power quality of the generator may be improved. As shown in FIG. 4, the skewing of components in the rotor 10 creates an angle θ between the orientation of the components and the axis of rotation. Since the standoffs 24 must have geometry that mates with both the rim and pole piece due to the lack of parallelism between the rim and pole piece, only two standoffs will then be required since identical components may be used.

Due to the configuration of the components described above, the assembly and manufacturing is simplified and lower in cost than has been accomplished hereto before. The first step in the assembly process is to arrange, the plurality standoffs 24 and pole pieces 22 circumferentially around the rim 16. Fasteners 20 are loosely coupled to the pole pieces 22 to hold the components during further assembly. In a typical 1-megawatt class generator, 28-56 sets of pole pieces 22 and standoffs 24 are required.

Next, beams 40 are inserted into the rotor 10 with the outer flange 42 of each beam 40 resting in between adjacent pole pieces 22. Wedges 36 are also inserted into recess 34 and against lip 32 in between each adjacent pair of pole pieces 22 until the lower edge of the wedge 36 contacts pole piece shoulder 35. After all these components are in place, the fasteners 20 are tightened causing the components to interlock tightly.

As described above, the width of the magnet 38 is smaller than the width of flange 42. This allows the magnets 38 to be inserted into the rotor 10 between adjacent pole pieces 22 without damaging the magnets 38. The magnet 38 is inserted until the bottom of the magnet 38 contacts the shoulder 35 on pole piece 22. Finally, the retainer plates 58 are fastened to the rim 16 by a pair of fasteners 62 to retain the rotor 10 components as an assembly.

During operation, the rotor 10 rotates about axis 12 within the generator (not shown). Due to centripetal forces generated by the rotation, the load of the magnets 38 will be transferred to the pole pieces 22 through the wedges 36. Since the beam 40 is interlocked with the pole pieces 22, the load of the beam 40 is also transferred to the pole pieces 22. This load is in turn transferred to the rim through fasteners 20. Through this arrangement, no load is placed on the magnets 38 further reducing the risk of damage.

While the invention has been described with reference to a preferred embodiment, it will be understood by those skilled in the art that various changes may be made and equivalents may be substituted for elements thereof without departing from the scope of invention. In addition, modifications may be made to adapt a particular situation or material to the teachings of the invention without departing from the essential scope thereof. Therefore, it is intended that the invention not be limited to the particular embodiment disclosed as the best mode contemplated for carrying out this invention.

What is claimed is:

1. A permanent magnet rotor arrangement comprising:
a rotor having a rim portion, said rim having an outer diameter;
a plurality of nonmagnetic beams, each of said plurality of beams in contact with said rim outer diameter;
a plurality of magnets, each of said magnets being in contact with and radially outward of one of said beams; and,
a plurality of standoffs, each of said plurality of standoffs being in contact with said rim and adjacent one of said plurality of beams.

2. The permanent magnet rotor arrangement of claim 1 further comprising a second plurality of standoffs axially spaced from said first plurality of standoffs, each of said second plurality of standoffs being in contact with said rim and adjacent one of said plurality of beams.

3. The permanent magnet rotor arrangement of claim 2 wherein said beam further includes a first flange in contract with said rim, a second flange in contact with said magnet and a web portion adjacent to said first standoff.

4. The permanent magnet rotor arrangement of claim 3 wherein said beam is made from aluminum.

5. The permanent magnet rotor arrangement of claim 3 wherein said plurality of standoffs is made of a nonmagnetic material.

6. The permanent magnet rotor arrangement of claim 1 further comprising a plurality of pole pieces arranged circumferentially around said rotor, each of said pole pieces being positioned between two of said magnets.

7. The permanent magnet rotor arrangement of claim 6 wherein each of said plurality of pole pieces includes a notch sized to receive one of said plurality of beams.

8. The permanent magnet rotor arrangement of claim 7 further comprising a plurality of wedges, each of said plurality of wedges being positioned between two of said plurality of pole pieces.

9. The permanent magnet rotor arrangement of claim 8 further comprising a retaining means for limiting axial movement of said wedge and said beams.

10. The permanent magnet rotor arrangement of claim 9 wherein said retaining means is a lip formed on each of said plurality of pole pieces.

* * * * *

UNITED STATES PATENT AND TRADEMARK OFFICE
CERTIFICATE OF CORRECTION

| | | |
|---|---|---|
| PATENT NO. | : 7,355,309 B2 | Page 1 of 1 |
| APPLICATION NO. | : 11/192384 | |
| DATED | : April 8, 2008 | |
| INVENTOR(S) | : Costin et al. | |

It is certified that error appears in the above-identified patent and that said Letters Patent is hereby corrected as shown below:

In column 6, claim 3, line 31, delete "contract" and insert -- contact --, therefor.

Signed and Sealed this

Twenty-ninth Day of July, 2008

JON W. DUDAS
*Director of the United States Patent and Trademark Office*